United States Patent
Burgio, Jr.

(10) Patent No.: US 10,330,858 B1
(45) Date of Patent: Jun. 25, 2019

(54) DEFORMABLE MOUNT FOR LED ASSEMBLY

(71) Applicant: James G. Burgio, Jr., Greensboro, NC (US)

(72) Inventor: James G. Burgio, Jr., Greensboro, NC (US)

(73) Assignee: Advanced Technology, Inc., Greensboro, NC (US)

( * ) Notice: Subject to any disclaimer, the term of this patent is extended or adjusted under 35 U.S.C. 154(b) by 329 days.

(21) Appl. No.: 15/170,099

(22) Filed: Jun. 1, 2016

Related U.S. Application Data

(63) Continuation-in-part of application No. 14/750,487, filed on Jun. 25, 2015, now Pat. No. 10,101,521.

(51) Int. Cl.
*F16B 2/24* (2006.01)
*F16B 5/06* (2006.01)
(Continued)

(52) U.S. Cl.
CPC ............ *G02B 6/0091* (2013.01); *F16B 2/245* (2013.01); *F16B 5/0635* (2013.01);
(Continued)

(58) Field of Classification Search
CPC ...... F16B 5/0635; F16B 5/0642; F16B 2/245; G02B 6/0091; G02B 6/0068; G02B 6/0073; G02B 6/0066; G02B 6/0086; G02F 1/133615; G09F 23/00; G09F 23/06; G09F 13/18; G09F 2013/1804; G09F 2013/1809; G09F 2013/1813; G09F 2013/1818; G09F 2013/1831; G09F 2013/1836; F21V 33/0024; F21V 33/004; F21V 33/006;
(Continued)

(56) References Cited

U.S. PATENT DOCUMENTS 4,439,818 A * 3/1984 Scheib ................ F21V 21/0808
362/221
5,433,024 A * 7/1995 Lerner ................... G02B 6/007
362/613
(Continued)

FOREIGN PATENT DOCUMENTS

EP 0 549 679 7/1993
WO WO 2016198312 A1 * 12/2016 ............. H05K 1/189

*Primary Examiner* — Erin Kryukova
(74) *Attorney, Agent, or Firm* — Tuggle Duggins P.A.; Blake Hurt

(57) ABSTRACT

A multilayered illuminated laminate system including a light source positioned proximate to an edge of a light panel that includes a series of reflective paint in the shape of diamonds of increasing size is provided. The system further includes a diffuser sheet of sufficient opacity that it obscures the diamond pattern on the bottom surface of the light panel and a reinforced panel formed from fiberglass that bestows the system with scratch, abrasion, impact, and chemical resistance to meet or exceed current regulatory requirements. The light source is positioned within a clamp mount that contains the light panel, diffuser, and reinforced panel in frictional engagement without the need for an adhesive. A graphic can be positioned between the diffuser sheet and the reinforced panel to increase the aesthetic appearance of the system exterior surface, as well as moderate the intensity of the light it emits.

5 Claims, 4 Drawing Sheets

(51) Int. Cl.
*F21V 8/00* (2006.01)
*G09F 13/18* (2006.01)
*G02F 1/1335* (2006.01)

(52) U.S. Cl.
CPC .......... *F16B 5/0642* (2013.01); *G02B 6/0051* (2013.01); *G02B 6/0055* (2013.01); *G02B 6/0085* (2013.01); *G02B 6/0095* (2013.01); *G02F 1/133615* (2013.01); *G09F 2013/1804* (2013.01)

(58) Field of Classification Search
CPC ............. F21Y 2107/10; F21Y 2107/70; F21Y 2115/00; F21Y 2115/10; F21Y 2115/30; F21S 4/22; F21S 4/24; F21S 4/26
See application file for complete search history.

(56) References Cited

U.S. PATENT DOCUMENTS

| | | | | |
|---|---|---|---|---|
| 5,887,968 | A * | 3/1999 | Logan | G09F 13/14 362/240 |
| 6,568,821 | B1 | 5/2003 | Page et al. | |
| 7,223,010 | B2 | 5/2007 | Min et al. | |
| 7,473,022 | B2 | 1/2009 | Yoo | |
| 8,277,070 | B1 | 10/2012 | Schwarz | |
| 8,628,229 | B1 | 1/2014 | Mc Neil | |
| 8,998,450 | B2 * | 4/2015 | Preuschl | H05K 1/0278 174/255 |
| 9,069,106 | B1 * | 6/2015 | Blessitt | F21S 8/04 |
| 2004/0037078 | A1 * | 2/2004 | Lee | A47G 23/06 362/249.01 |
| 2006/0285358 | A1 * | 12/2006 | Chen | G09F 13/04 362/613 |
| 2007/0076381 | A1 * | 4/2007 | Han | F21K 9/00 361/749 |
| 2007/0091639 | A1 * | 4/2007 | Yoo | G02B 6/0021 362/612 |
| 2009/0116241 | A1 * | 5/2009 | Ashoff | F21V 33/006 362/253 |
| 2010/0149835 | A1 * | 6/2010 | Cho | G02B 6/0091 362/612 |
| 2010/0226125 | A1 * | 9/2010 | Liao | F21V 19/004 362/235 |
| 2010/0277904 | A1 * | 11/2010 | Hanley | F21V 1/04 362/235 |
| 2011/0219648 | A1 | 9/2011 | James et al. | |
| 2012/0217520 | A1 * | 8/2012 | Baik | H05K 1/0278 257/88 |
| 2012/0236598 | A1 * | 9/2012 | Germain | G09F 13/18 362/612 |
| 2013/0039093 | A1 * | 2/2013 | Song | G02B 6/002 362/613 |
| 2013/0077348 | A1 * | 3/2013 | Byun | F21S 8/00 362/613 |
| 2013/0301295 | A1 * | 11/2013 | Iwasaki | F21V 7/00 362/609 |
| 2014/0029261 | A1 * | 1/2014 | Otterson | H05K 1/0278 362/249.06 |
| 2014/0153245 | A1 * | 6/2014 | Horvath | F21K 9/00 362/249.06 |
| 2015/0153500 | A1 * | 6/2015 | Maeda | G02B 5/045 362/606 |
| 2015/0208522 | A1 * | 7/2015 | Kim | H05K 1/028 361/749 |
| 2015/0354797 | A1 * | 12/2015 | Luo | H05K 1/028 362/223 |
| 2016/0291244 | A1 * | 10/2016 | Trutna | G02B 6/002 |
| 2017/0351127 | A1 * | 12/2017 | Masuda | F21V 5/02 |
| 2018/0063957 | A1 * | 3/2018 | Watanabe | H05K 1/147 |
| 2018/0074251 | A1 * | 3/2018 | Berard | G02B 5/0242 |

\* cited by examiner

DEFORMABLE MOUNT FOR LED ASSEMBLY

This is a continuation-in-part of and claims benefits under pending prior application Ser. No. 14/750,487 filed 25 Jun. 2015, now U.S. Pat. No. 10,101,521 which is incorporated by reference in its entirety herein.

FIELD OF THE INVENTION

The invention herein pertains to illuminated substrates and particularly pertains to multilayer laminate that utilizes a light guide carrying a plurality of digitally printed diamonds to uniformly reflect the edge lighting and emit luminescence along the entire face of the top surface.

DESCRIPTION OF THE PRIOR ART AND OBJECTIVES OF THE INVENTION

Edge lit illumination systems with a light source positioned abuttingly or in close proximity to a light transmitting surface or sheet are known in the art (see for example European Patent No. 0549679 or U.S. Pat. No. 6,568,821). The prior art is replete with examples of mechanisms and methods to light one or more substrates that are sufficiently translucent to permit light from behind or aside the substrate to emit luminance through it. For example, certain translucent granite counter tops can be lit by building a cabinet under the substrate and putting any variety of lights under or aside it, so that the top when observed glows with light and emits luminance into the room and is readily seen. However, the granite in these systems may be considered heavy, expensive, and susceptible to scratching, abrasion, and chemicals. In the commercial sign industry there are many "light boxes" that house lights and can produce a lit substrate surface that will emit luminescence. Such arrangements are common at restaurants, airports, and other high traffic environments. These light boxes are so named in part because they define an air gap between the light source and the lit substrate. Due to their location and positioning, it is common for this type of box to be formed with a polymer substrate material such as acrylic. These acrylic substrates may utilize printing technology, line scouring, etching techniques, or the like to enhance emitted luminescence. The exterior surface of the substrate may be treated so that the light entering from behind or aside the substrate is regularly or irregularly reflected or scattered. This treatment of the substrate has been found to emit more luminescence than would be anticipated based solely on the intensity of the light source. Unfortunately, the acrylic is also susceptible to scratching, abrasion, and chemical treatment, and thus is unsuitable for counter tops, backsplashes, table tops, bar tops, modesty panels, and the like. Additionally, it is known in the art for acrylic manufacturers to produce substrates coupled with one or more diffusers that serve to rotate or "turn" edge light up to ninety degrees (90°) to emit luminance.

A further issue with the illuminated substrates known in the prior art is that they nearly all require a panel of predefined dimensions, often contained within a mount or frame that cannot be significantly altered, least the emitted illuminative properties of the substrate be altered. This presents a significant disadvantage for installers of these substrates, who routinely encounter errors in measurement, outlet location, and hardware position to name a few. Still other substrates include the light source (usually an LED light source) mounted within a channel frame, further complicating installation and replacement.

Thus, in view of the problems and disadvantages associated with prior art devices, the present invention was conceived and one of its objectives is to provide a multilayer illuminated laminate that is scratch, abrasion, impact, and chemical resistant.

It is another objective of the present invention to provide a multilayered illuminated laminate formed with layers that abut one another, leaving no voids or spaces therebetween.

It is still another objective of the present invention to provide a multilayered illuminated laminate with a series of diamonds digitally printed in a formulaic manner on an acrylic substrate with white ink thereon.

It is yet another objective of the present invention to provide a multilayered illuminated laminate system with a light emitting diode (LED) light source defining at least six (6) diodes per lineal inch and attached to an edge of the acrylic panel most proximate the row of smallest diamonds.

It is a further objective of the present invention to provide a multilayered illuminated laminate with a diffuser layer configured with sufficient density and opacity to obscure the printed diamond pattern while permitting passage of the greatest amount of luminosity.

It is still a further objective of the present invention to provide a multilayered illuminated laminate that meets or exceeds all current ASTM and NEMA laminate specifications for abrasion, impact, and chemical resistance.

It is yet a further objective of the present invention to provide a multilayered illuminated laminate with a translucent fiberglass reinforced panel layer.

It is still another objective of the present invention to provide a multilayered illuminated laminate with an interchangeable graphic layer.

Various other objectives and advantages of the present invention will become apparent to those skilled in the art as a more detailed description is set forth below.

SUMMARY OF THE INVENTION

The aforesaid and other objectives are realized by providing a multilayered illuminated laminate system including a pivotable aluminum clamp mount that attaches the system to a white mounting substrate such as a wall and houses a twenty-four inch (24") long LED light source approximately three-sixteenths of an inch (0.188") thick, defining six (6) diodes per lineal inch and producing about forty (40) lumens of illumination per inch. The light source on a single twenty-four volt (24 v) transformer is affixed to a lateral edge of an acrylic panel defining the same thickness as the light source and illuminating the face of the panel up to sixteen feet (16') without a perceptible reduction in lumens. On the planar, horizontal surface most proximate the mounting substrate, a series of diamond shapes are digitally printed with a predetermined orientation relative to other diamonds that is maintained as the size of the diamond increases as the location of the diamond moves gradually further away from the light source. A partially opaque diffuser sheet is attached to the opposing horizontal panel surface to hide the diamond pattern from view and increase overall luminance. The diffuser sheet planar surface opposite the surface attached to the panel defines a printed graphic or pattern in translucent ink to increase the aesthetic appearance of the system which can be changed as desired by an owner. A translucent fiber reinforced panel layer is positioned atop the diffuser sheet to ensure that the laminate is impact, abrasion, and chemical resistant.

A method of illuminating a substrate by redirecting edge light with a series of printed diamonds positioned in a predetermined and formulaic orientation is also provided.

DETAILED DESCRIPTION OF THE PREFERRED EMBODIMENT AND OPERATION OF THE INVENTION

Figure 1:
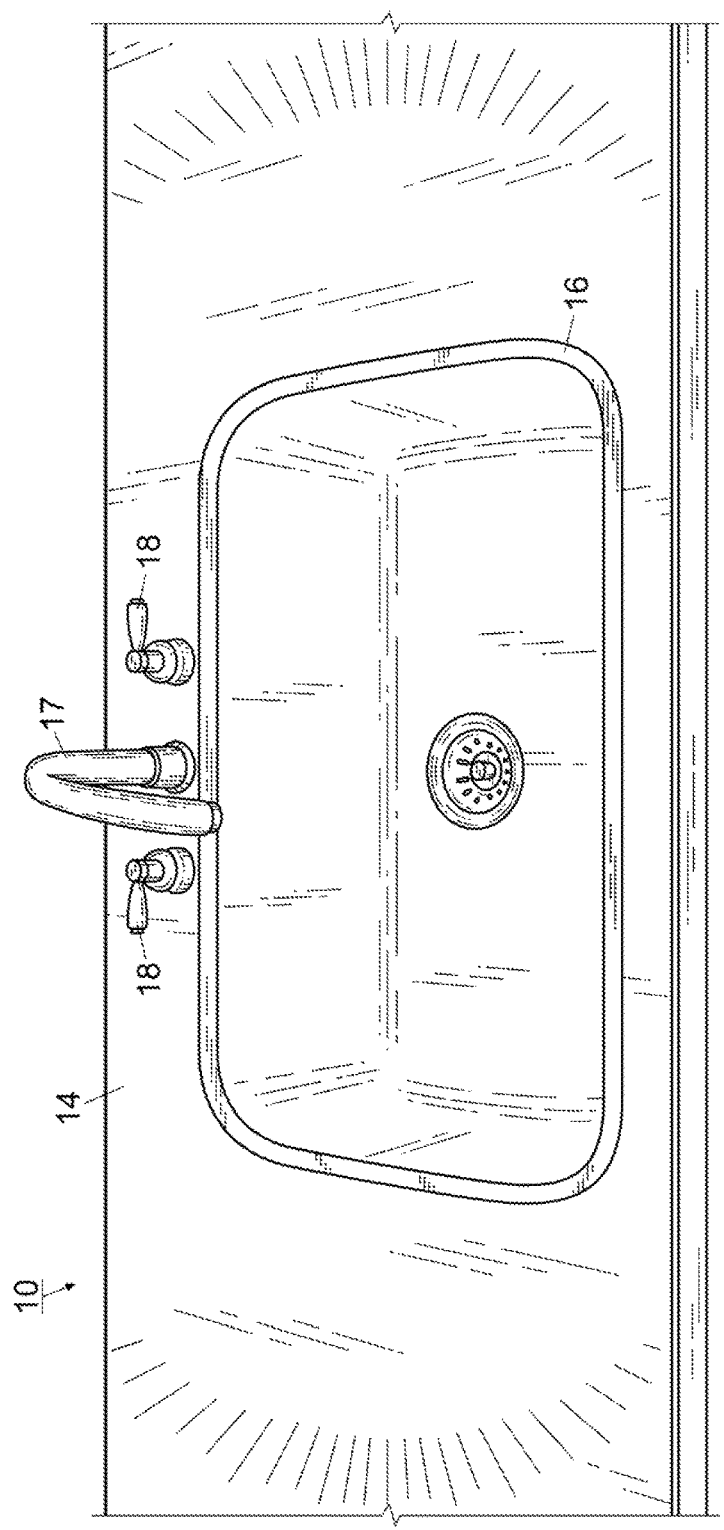
FIG. 1 shows an elevated side perspective view of a multilayered illuminated laminate system installed.

For a better understanding of the invention and its operation, turning now to the drawings, FIGS. 1-4 represent the preferred embodiment of multilayered illuminated laminate system 10 formed by light source 11 mounted to light panel 12, diffuser sheet 13, and reinforced panel 14. As will be described in further detail below, laminate system 10 can be applied directly to wall board, medium density fiberboard (MDF), plywood, drywall, or other preferred mounting substrates 15 without creating a void or gap either vertically or horizontally therebetween. Although not required, it may be preferable to include heat sink material 24 beneath light panel 12 to dissipate heat buildup emanating therefrom. If such a material causes a void between laminate system 10 and mounting substrate 15, such void can be filled with spacing shims, or substrate 15 can be routed out slightly (for example, about 0.020") to accommodate the bottom portion of clamp mount 21. An embodiment of laminate system 10 may include a separate or integral component of heat sink 24 that defines a reflective surface, further adding to the reflective luminescence emitting from light panel 12. As represented schematically in FIG. 1, laminate system 10 may be utilized in bar tops, counter tops, back splash panels, table tops, modesty panels, wall hangings, ceiling applications, or other substantially planar surfaces that a user may wish to illuminate. The example in FIG. 1 demonstrates that laminate system 10 may define a significant internal void or voids, as it would be understood that a hole is generally cut to install conventional sink 16 and apertures formed to accept conventional faucet 17 and handles 18, while maintaining a consistent amount of luminance throughout the exterior surface of laminate system 10. As would be understood holes or voids can be cut on-site during installation to accommodate for horizontal or vertical placement such as for example sink and faucet cutouts or outlets and electrical receptacles. Such cutouts require use of either a cover, reflective tape or otherwise to sufficiently cover the cut edges and contain the luminance within the acrylic sheet and avoid unwanted light emittance therearound. Even when such cutouts are made to accommodate light switches, sinks, faucets, outlets, etc., the light will bounce off diamonds 19 and create luminance on the not lit side of the cutout so that it appears light is coming from more than one source, since the light bounce that is achieved by light bouncing off the facets of diamond 19 are numerous. It should be appreciated by one of skill in the art that while illuminated system 10 is referred to throughout as a "laminate", the invention as described in further detail below may apply to illuminated substrates formed from any desired material.

Preferred light panel (also known as a light guide panel) 12 is represented throughout the figures as a generally rectangular member formed from a transparent material suitable for transmitting light produced by light source 11 but is preferably formed from a polymeric material such as substantially clear acrylic. Light panel 12, diffuser sheet 13, and reinforced panel 14 are intended to be configured (i.e. sized, shaped, and treated) to be formed into a wide variety of shapes and sizes standard to the laminate industry, for example two feet wide or four feet wide by eight feet long (2'×8' or 4'×8', respectively), although it should be understood that any configuration up to sixteen feet (16') in length is contemplated within the scope of the instant invention. Regardless of width, length, and shape, preferred light panel 12 defines a generally consistent thickness between an eighth of an inch and three sixteenths of an inch ($\frac{1}{8}^{th}$ to $\frac{3}{16}^{th}$). Light panel 12 may define a pair of opposing planar faces 20, 20', referred to herein as "bottom" and "top" faces, respectively. Light panel 12 preferably includes at least one of planar faces 20, 20' that has been painted, grooved, roughened, or otherwise treated to bestow the capability to reflect, refract, or otherwise scatter light produced from light source 11 on one or more surfaces of light panel 12. Preferably, bottom face 20 (i.e. the face positioned most proximate mounting substrate 15) includes a matrix of light reflecting members positioned in a predetermined position and orientation. Preferably the light reflecting members take the form of diamonds 19 digitally printed with light reflecting white ink on bottom face 20. Alternate embodiments may include but are not limited to acrylite, etched light guide panels and dotted light guide panels to provide a substantially brighter luminance of the final laminate. Further, although not discussed in detail herein by using a dimmer the brightness of the light source 11 can be controlled downward when necessary for aesthetic reasons.

Figure 2:
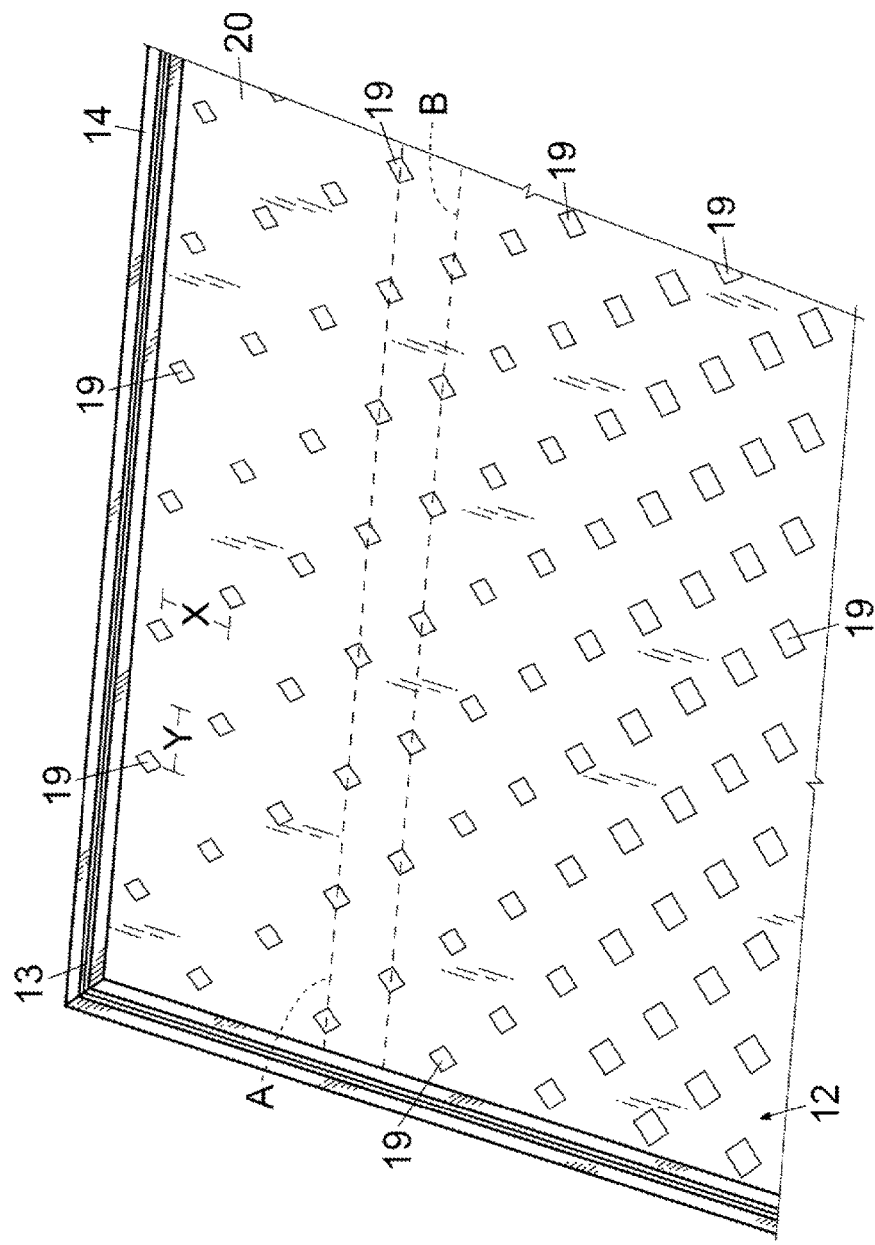
FIG. 2 pictures a bottom perspective view of the multilayered illuminated laminate in FIG. 1 without the light source or kitchen accessories.

FIG. 2 pictures a bottom perspective view of the multilayered illuminated laminate 10 without light source 11 or accessories such as sink 16, faucet 17, and handles 18. Diamonds 19 may be grouped into laterally extending series or rows with respect to light panel 12, positioned a predetermined distance apart. For example, a first group is positioned along laterally ending dashed line "A" while a second group is positioned along laterally extending dashed line "B". In a preferred embodiment, diamonds 19 of Group B are positioned laterally offset the diamonds 19 of Group A, which results in the greatest amount of luminescence reflected out of light panel 12 from light source 11. Each diamond 19 in the lateral group closest or most proximal light source 11 may define a shape with greater or less than ninety degree (90°) angles, is 0.0269 inches wide and 0.0488 inches long, creating a diamond shape with two parallel sides that are twice as long as two shorter, parallel sides, resulting in a shape with a "point" facing light source 11 and presenting at least one of the longest sides to light source 11. The associated "offset" group as described in Group B above includes diamonds 19 of the same size and shape as those in the group more proximate light source 11 but are laterally displaced relative to diamonds 19 of this first group by predetermined measurement X (preferably 0.105 inches) longitudinally away from light source 11 and predetermined measurement Y (preferably 0.0625 inches) laterally. In addition, preferred diamonds 19 also increase in overall size (i.e. length and width) as they are positioned more distal relative to light source 11. In a preferred embodiment, this offset results in a total spatial shift of fifty percent (50%) of the total distance between diamonds 19. An embodiment of diamonds 19 increases in size by 100.6% as they are positioned longitudinally further away from light source 11, increasing the amount of light reflected from diamonds 19. Along with the aforementioned "growth rate", each group of diamonds 19 after the offset group is positioned longitudinally 0.21 inches (measured from the center of respective diamonds 19) away from the previous group, meaning that when the overall size of diamonds 19 increases, the space between diamonds 19 decreases, producing even greater reflection of light from light source 11. An orientation as described also produces a larger, overall diamond pattern formed from three rows of diamonds 19, further enhancing the luminescence produced by light panel 12. This superior production of luminescence and reflection from light source 11 is quite unexpected when considering the physics of light reflection taught in the prior art, which teaches multifaceted shapes or circular shapes to reflect light, as it would be assumed that the more faces or curved faces would be more efficient at reflecting the light from light source 11, as well as reflecting light in a superior fashion compared to etching, v-grooving, or other methods as are known in the art. Given that shapes with higher number of faces, such as hexagons which are taught in the art, become more like circles the more faces they define, it is quite unexpected to produce such a high level of reflection and associated luminescence with a shape with only four sides (experimentally determined to be approximately 25% brighter than the prior art).

Figure 3:
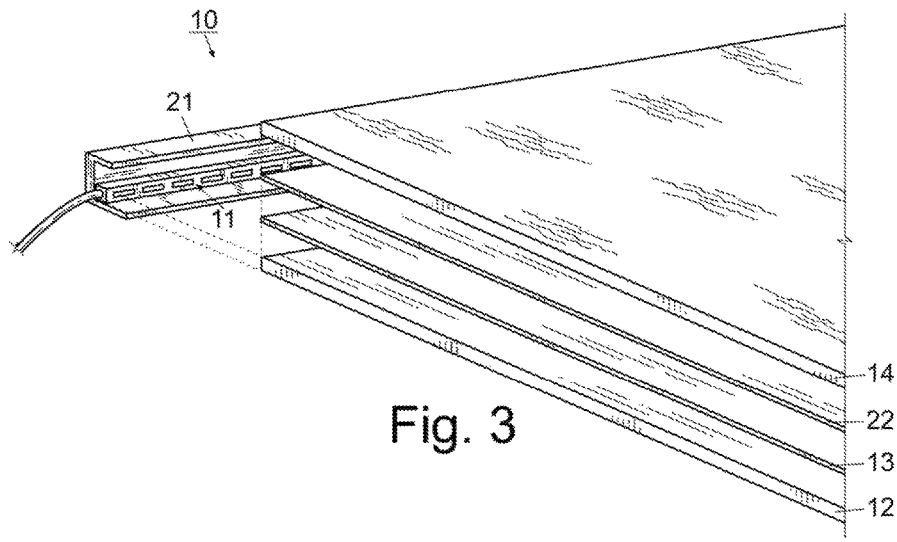
FIG. 3 depicts a side perspective exploded view of the multilayered illuminated laminate system of FIG. 2 with the light source and mount.
Figure 4:
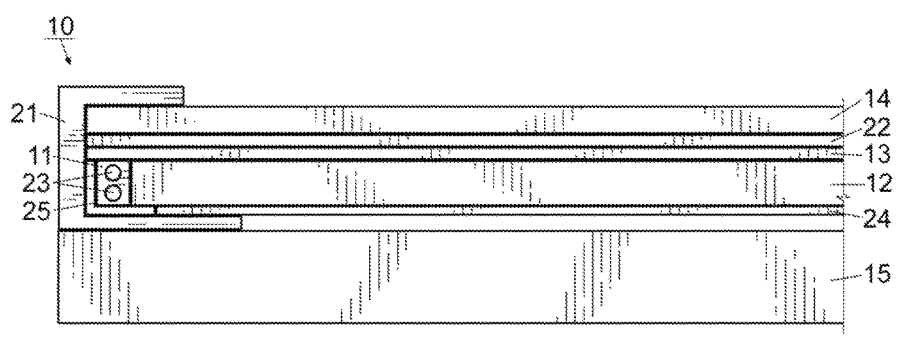
FIG. 4 demonstrates an elevated side plan view of the multilayered illuminated laminate system of FIG. 3.

FIGS. 2 and 4 display multilayered illuminated laminate 10 in the assembled configurations while FIG. 3 illustrates multilayered illuminated laminate 10 with light source 11, light panel 12, diffuser sheet 13, graphic member 22, reinforced panel 14, and mounting substrate 15 exploded apart. An alternate embodiment may further include a reflective or white protective layer (not shown) positioned between the light panel 12 and mounting substrate 15. Diffuser sheet 13 is preferably a partially opaque member substantially the same length and width dimensions as light panel 12 that attaches atop light panel 12 on the surface considered here top surface 20', opposite that which includes diamonds 19. Diffuser sheet 13 may be formed from many different materials and may further include either a printed design, graphic, etc. (represented schematically as member 22 in FIGS. 3 and 4) laid over top or printed directly on the surface opposite light panel 12. An alternate embodiment may include a design, graphic, etc. (not shown) printed on or attached to the bottom surface of reinforced panel 14, reducing the total number of layers included in laminate 10, and if produced with sufficient opacity (i.e. such that diamonds 19 are not visible), diffuser sheet 13. Graphic 22 may be substantially the same length and width measurements as light panel 12 and diffuser sheet 13, or it may define a smaller overall size, creating areas of brighter luminescence beyond the display. Regardless of its position, multilayered illuminated laminate 10 may evenly illuminate this graphic along the longitudinal length thereof, and by virtue of clamp mount 21 discussed further below, allow a user to exchange the design or graphic displayed, providing an enhanced level of flexibility when considering interior design aesthetics.

Reinforced panel 14 is preferably the same general length and width as light panel 12 and diffuser sheet 13 and bestows upon multilayered illuminated laminate 10 characteristics such as scratch, abrasion, impact, and chemical resistance not taught by similar systems in the prior art. Preferred reinforced panel 14 is formed from a translucent thermoset resin sold commercially as Luxcore™ by the instant applicant which has superior scratch, abrasion, impact, and chemical resistance compared to thermoplastic resins and other polymer-based materials. Luxcore™ is a polymer blend, fiberglass reinforced material that may be used in both horizontal and vertical applications and meets industry standards such as NEMA and ASTM that acrylics, polyethylene terephthalate glycol (PETG) do not satisfy. Additionally, Luxcore™ includes glass fibers that are randomly positioned within the resin during the manufacturing process, producing a unique glass fiber position that may result in a more natural, aesthetically pleasing optical quality not found in the prior art systems.

Figure 5:
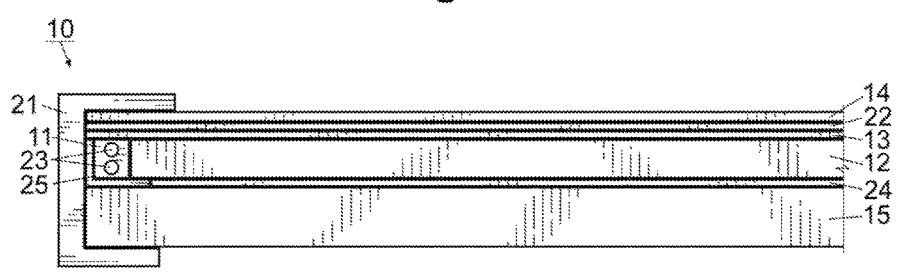
FIG. 5 illustrates an elevated side plan view of the multilayered illuminated laminate system of FIG. 3 encapsulated.

The use of adhesives to affix and contain light panel 12, diffuser sheet 13, reinforced panel 14, and mounting substrate 15, respectively, is disfavored due to the resulting luminescence distortion. Therefore, preferred multilayered illuminated laminate 10 includes clamp mount 21 that carries and protects light source 11 as well as compresses the various layers of multilayered illuminated laminate 10 as represented in FIG. 4. Preferably clamp 21 is an aluminum angle-style clamp that may be mounted to substrate 15, for example with pressure-sensitive adhesive, snap frames, J channels, welded frames, L channels, U channels, solid surfacing molding, wood moldings, and the like, but may also be pivotally connected to substrate 15 via conventional mechanical hardware (not shown) that may permit a user to exchange graphic member 22 as desired. Although not shown, it may be desirable to encapsulate the edges of illuminated laminate system 10, for example by building a frame therearound or installing trim for the same effect (see FIG. 5). In addition to increasing the emitted luminescence of laminate system 10, such a feature adds structural stability to the entire assembly and may serve as an attachment point for mechanical fasteners (not shown). An embodiment of clamp 21 may serve directly as a heat sink, include heat sink material therein such as heat sink tape, or be in direct contact with one or more additional heat sinks or heat sink materials for the purpose of dissipating the heat produced by light source 11 (clamp heat sink materials not shown). Clamp 21 may define a substantially J shape to accommodate the combination of layers as shown in FIG. 4, although it should be understood that any shape and material that secures the layers of multilayered illuminated laminate 10 is within the contemplation of the instant invention (L clamp, C clamp, U clamp, etc.). Further, although clamp 21 is only illustrated on one side of multilayered illuminated laminate 10, it should be understood that additional clamps 21 may be used as needed for safe and efficient use, including embodiments that include clamps 21 along all sides of multilayered illuminated laminate 10.

Clamp mount 21 serves as the primary attachment for light source 11, for example with a pressure sensitive mounting strip, along at least one edge of multilayered illuminated laminate 10. Light source 11 preferably includes a separate bracket 25 attached by adhesive or fastener to clamp mount 21. Although any suitable light source may serve as light source 11, a novel light emitting diode (LED) assembly 23 is preferred as it produces the proper light intensity and density via six (6) diodes per inch along the edge of light panel 12. Preferably, LED assembly 23 defines a thickness that matches the thickness of light panel 12, for example three-sixteenths (3/16$^{th}$) of an inch, so that LED assembly 23 can directly contact the edge of light panel 12 with no gaps, fully transmitting the full luminescence of light source 11 to light panel 12. LED assembly 23 may define a length of up to twenty-four (24) inches to light a light panel 12 of the same width for up to sixteen (16) feet in length without a perceptible reduction in luminescence or lumens. The twenty-four (24) inch long LED assembly 23 may operate off a single twenty-four (24) volt transformer, but in a situation where a wider light panel 12 is preferred, embodiments of LED assembly 23 may further include male and female attachment hardware such as prongs and corresponding receptacles (not shown) to link two (2) twenty-four (24) inch assemblies together to produce a total assembly length up to forty-eight (48) inches. As can be appreciated, the LED assembly preferably includes LED clusters that are spaced approximately one and a half (1½) inches apart, such that were it desirous to cut mount 21 and LED assembly 23 to a specified length, such would be possible without damaging assembly 23. By assembly, constructing, and positioning LED assembly 23 in the manner described, each LED cluster has been measured producing forty (40) lumens of light per inch and luminescence out the face of light panel 12 of approximately two hundred fifty (250) lumens or two hundred (200) lumens out the face of reinforced panel 14 with graphic member 22 in place, all produced uniformly up to sixteen feet from light source 11.

An alternate embodiment of multilayered illuminated laminate 10 (not shown) may include arches that define a height up to six (6) inches for a light panel 12 twenty-four (24) inches wide or up to ten (10) inches for a light panel 12 forty-eight (48) inches wide on a top surface. Diamonds 19 are capable of reflecting light into areas that are not otherwise edge lit, for example the arches described above. Therefore, while the LED assembly is not attached through the height of the arch, the luminescence extends about the entire arch architecture. Additional geometric architecture may be similarly lit with limitations.

A method of illuminating a surface traditionally considered for wood, granite, or the like may include the steps of providing an LED light source within a clamp, positioning the LED light source in contact with a light panel with reflective paint in the shape of a diamond digitally printed thereon in a predetermined pattern, stacking a diffuser sheet, graphic design, and reinforcement layer, and clamping the laminate together to form a surface that is scratch, abrasion, impact and chemical resistant and that can be illuminated up to two feet wide and sixteen feet long without dark spots or loss of luminescence is also provided. This method remains constant even when voids are formed to accommodate sinks, electrical outlets, hardware, and the like. The illuminated laminate can be securely affixed to the mounting substrate without adhesive via mechanical fasteners drilled or driven through the clamp body or frame (if one is used) to avoid optical distortions.

Figure 6:
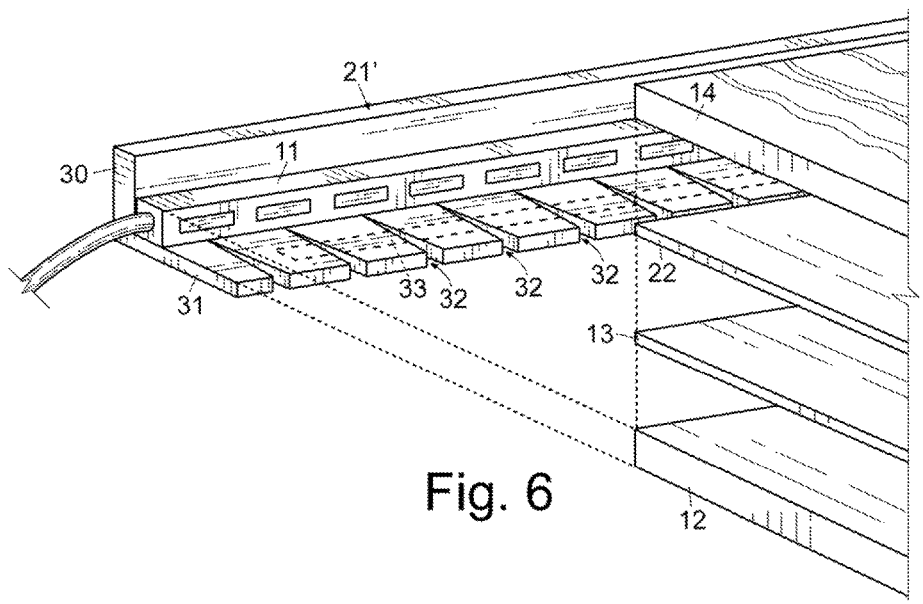
FIG. 6 depicts a side perspective exploded view of the multilayered illuminated laminate system of FIG. 2 with an alternate embodiment of a light source and mount.
Figure 7:
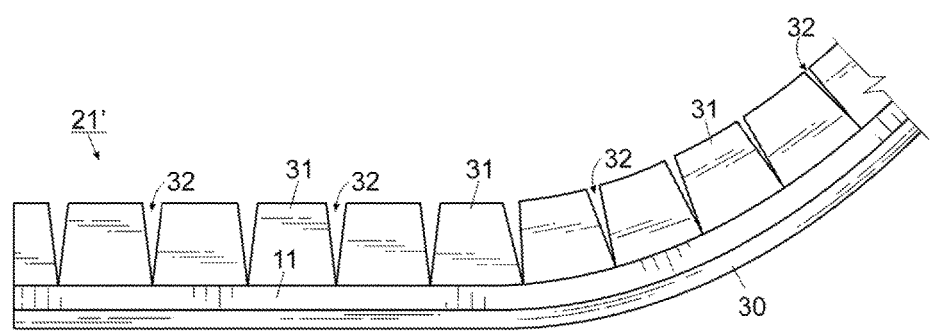
FIG. 7 shows a top plan view of the light source and mount of FIG. 6 in a partially deformed position.

An alternate embodiment of clamp mount 21' is illustrated in FIGS. 6 and 7. Depending on the intended mounting substrate 15 on which a user may desire to mount multilayered illuminated laminate 10 (i.e. backsplashes, table tops, counter tops, wall hangings, ceiling hangings, and the like), it has been determined that achieving a satisfactory seal on the edge surface thereof while maintaining desirable heat sink functionality, with particular emphasis on the placement of light source 11 and light panel 12, is a challenging, labor intensive, and highly expensive proposition. As described above, it is disadvantageous to distort the edge of light panel 12, for example by routing or the gross application of adhesive, as it may affect the illuminative properties produced by multilayered illuminated laminate 10. FIG. 6 depicts a side perspective exploded view of multilayered illuminated laminate 10 with clamp mount 21' separated therefrom, with the understanding that although the entire length of clamp mount 21' is not shown, the remaining portion of clamp mount 21' is identical to that depicted. Preferred clamp mount 21' includes short leg 30 and long leg 31 formed from metal such as aluminum. An embodiment of clamp mount 21' defines the shape of an L, although other configurations with a shorter, vertically oriented member and a longer, horizontally oriented member are also contemplated. In the preferred embodiment, clamp mount 21' is formed from aluminum approximately one fortieth (0.025") of an inch thick, either sheet stock or extruded, with short leg 30 defining a length of three-sixteenths of an inch (0.188") and oriented perpendicularly (i.e. ninety degrees) with respect to long leg 31, which defines a length of one-half an inch (0.50"). While the terms "long" and "short" may reflect relational size relative to one another, nothing in these terms is intended as an inherent limitation on actual size, such that long leg 31 and short leg 30 may be the same size in one embodiment, and potentially "long" leg 31 may define a shorter length than "short" leg 30. However, as will be described in further detail below, it is preferable that short leg 30 define a length sufficient to carry light source 11 and long leg 31 define a length sufficient to include one or more notches 32.

As demonstrated in a perspective view in FIG. 6 and a top plan view in FIG. 7, preferred clamp mount 21' defines one or more notches 32 in long leg 31. The notches may extend substantially the entire length of long leg 31, and it is preferable to define notches 32 in a repeatable manner, for example less than about every half inch (0.5") along the longitudinal length of clamp mount 21' for predictable deformation, and preferably no more than about every one quarter inch (0.25") for structural dependability, and most preferably between one quarter inch and one half inch (0.25"-0.5") for performance and strength purposes. Although it is contemplated that numerous shapes of notch 32 may suffice for the intended purpose, preferred notch(es) 32 defines a triangular or wedge shape. The purpose of notch 32 is to permit that desirable deformation of clamp mount 21', specifically in circumstances when mounting substrate 15 does not define a uniformly linear (i.e. "straight") edge to which attaching clamp mount 21 would be easily effected. It has been determined that without the presence of notches 32, clamp mount 21 does not deform as desired and may not uniformly attach to the edge of light panel 12, leading to inconsistent luminescence, lack of heat dissipation, and undesirable spacing gaps. The failure to dissipate heat is of particular concern, as the confinement of LEDs produces significant heat which, if unaddressed, may become excessive and shorten the LED lifespan by up to half. With notches 32 defined within long leg 31, clamp mount 21' may be arcuately deformed along substantially its entire length, or a portion of clamp mount 21' may be deformed while the remainder remains in a generally linear orientation, as illustrated in FIG. 7.

Once notches 32 have been formed within preferred clamp mount 21', light source 11 as described above may be mounted to short leg 30, preferably light emitting diode (LED) assembly 23 utilizing a pressure sensitive adhesive positioned on the back (not shown). Given the relatively small mounting surface, light source 11 may define the preferable width of no more than four millimeters (4 mm)

and preferably four millimeters (4 mm) to accurately position the LEDs relative to light panel 12. Further, an additional length of adhesive, for example pressure sensitive strip 33, is preferably positioned on long leg 31 to assist in the secure attachment of clamp mount 21' to light panel 12. Pressure sensitive strip 33 is preferably a tape one quarter inch (0.25") wide and one millimeter (1 mm) thick and oriented along the longitudinal length of clamp mount 21'.

The illustrations and examples provided herein are for explanatory purposes and are not intended to limit the scope of the appended claims.

I claim:

1. A metallic clamp mount formed from aluminum approximately one fortieth (0.025") of an inch thick and defining a L shape for use in connection with a multilayered illuminated laminate system, the clamp mount comprising a first leg attached in perpendicular orientation to a second leg carrying a light source, the light source positioned and attached at the vertex between the first and second legs, the first leg defining a plurality of triangular, wedge-shaped notches, whereby the clamp mount defines a size and shape configured to position the light source in contacting relation relative to a lateral edge of a light panel in the multilayered illuminated laminate system, the multilayered illuminated laminate system comprising a light panel defining a planar top surface and an opposing planar bottom surface, the bottom surface carrying a plurality of reflective members, a diffuser sheet with a top surface and a bottom surface, the diffuser sheet bottom surface positioned on and contacting the top surface of the light panel, a reinforced panel with a top surface and a bottom surface, and a graphic member with a top surface and a bottom surface, the graphic member top surface contacting the reinforced panel bottom surface and the graphic member bottom surface contacting the diffuser sheet top surface, whereby the light panel, diffuser sheet, and reinforced panel define the same general dimensions, and together with graphic member define a multilayered laminate without voids between respective layers of the multilayered laminate, and whereby the clamp mount is longitudinally deformable relative to an arcuate edge of a mounting substrate such that the light panel planar bottom surface is mounted on the clamp mount first leg and the clamp mount uniformly attaches to the lateral edge of the light panel mounted with the mounting substrate.

2. The clamp mount of claim 1 whereby the light source is an LED assembly defining a width of 4 mm.

3. The clamp mount of claim 1 whereby the light source defines six LEDs per lineal inch.

4. A metallic clamp mount formed from aluminum approximately one fortieth (0.025") of an inch thick and defining a L shape for use in connection with a multilayered illuminated laminate system, the clamp mount comprising a first leg defining a length of half an inch (0.5") attached in perpendicular orientation to a second leg carrying a light source and defining a length of three-sixteenths of an inch (0.188"), the light source positioned and attached at the vertex between the first and second legs, the first leg defining a plurality of triangular, wedge-shaped notches spaced between one quarter of an inch and one half an inch (0.25"-0.5") apart, whereby the clamp mount defines a size and shape configured to position the light source in contacting relation relative to a lateral edge of a light panel in the multilayered illuminated laminate system, the multilayered illuminated laminate system comprising a light panel defining a planar top surface and an opposing planar bottom surface, the bottom surface carrying a plurality of reflective members, each of the reflective members defining the shape of a diamond, a diffuser sheet with a top surface and a bottom surface, the diffuser sheet bottom surface positioned on and contacting the top surface of the light panel, a reinforced panel with a top surface and a bottom surface, and a graphic member with a top surface and a bottom surface, the graphic member top surface contacting the reinforced panel bottom surface and the graphic member bottom surface contacting the diffuser sheet top surface, whereby the light panel, diffuser sheet, and reinforced panel define the same general dimensions, and together with graphic member define a multilayered laminate without voids between respective layers of the multilayered laminate, whereby the clamp mount is longitudinally deformable such that the light panel planar bottom surface is mounted on the clamp mount first leg and the clamp mount uniformly attaches to the lateral edge of the light panel mounted with a mounting substrate, and whereby the light source defines six LEDs per lineal inch.

5. The clamp mount of claim 4 whereby the light source is an LED assembly defining a width of 4 mm.

\* \* \* \* \*